(12) United States Patent
Liang

(10) Patent No.: US 12,556,002 B2
(45) Date of Patent: Feb. 17, 2026

(54) METHOD FOR LOAD TRANSFER FOR OPEN-LOOP POWER GRID

(71) Applicant: JIANGMEN POWER SUPPLY BUREAU OF GUANGDONG POWER GRID CO., LTD., Guangdong (CN)

(72) Inventor: Guangyu Liang, Guangdong (CN)

(73) Assignee: JIANGMEN POWER SUPPLY BUREAU OF GUANGDONG POWER GRID CO., LTD., Guangdong (CN)

( * ) Notice: Subject to any disclaimer, the term of this patent is extended or adjusted under 35 U.S.C. 154(b) by 421 days.

(21) Appl. No.: 18/024,766

(22) PCT Filed: Sep. 16, 2020

(86) PCT No.: PCT/CN2020/115440
§ 371 (c)(1),
(2) Date: Mar. 5, 2023

(87) PCT Pub. No.: WO2022/052142
PCT Pub. Date: Mar. 17, 2022

(65) Prior Publication Data
US 2023/0344229 A1    Oct. 26, 2023

(30) Foreign Application Priority Data

Sep. 8, 2020   (CN) .......................... 202010935900.0

(51) Int. Cl.
*H02J 3/14*     (2006.01)
*H02J 3/00*     (2006.01)
*H02J 3/001*    (2026.01)
*H02J 3/0012*   (2026.01)

(52) U.S. Cl.
CPC ............ *H02J 3/144* (2020.01); *H02J 3/0012* (2020.01); *H02J 3/00125* (2020.01);
(Continued)

(58) Field of Classification Search
CPC ...... H02J 3/144; H02J 3/0012; H02J 3/00125; H02J 2203/10; H02J 2203/20;
(Continued)

(56) References Cited

U.S. PATENT DOCUMENTS

| 9,871,376 B2 * | 1/2018 | Shen ..................... G05B 13/021 |
| 2014/0249688 A1 * | 9/2014 | Ansari ..................... H02J 3/381 700/297 |

(Continued)

FOREIGN PATENT DOCUMENTS

| CN | 102916431 A | 2/2013 |
| CN | 103928926 A | 7/2014 |

(Continued)

OTHER PUBLICATIONS

International Search Report for PCT/CN2020/115440 mailed Jun. 8, 2021, ISA/CN.
(Continued)

*Primary Examiner* — Jigneshkumar C Patel
(74) *Attorney, Agent, or Firm* — Yue (Robert) Xu; Apex Attorneys at Law, LLP

(57) ABSTRACT

Provided is a method for load transfer for an open-loop power grid. The method includes: constructing a tree graph for the power grid based on power transmission among devices in the power grid; determining a target node representing a target device which triggers load transfer in the open-loop power grid; determining one or more target graphs; enumerating all transfer schemes for the target graphs based on the target graphs, and prioritizing the transfer schemes; and performing load transfer based on the prioritized transfer schemes.

12 Claims, 7 Drawing Sheets

(52) U.S. Cl.
CPC ....... *H02J 2203/10* (2020.01); *H02J 2203/20* (2020.01); *H02J 2310/60* (2020.01)

(58) Field of Classification Search
CPC ........ H02J 2310/60; H02J 3/0073; H02J 3/00; G06Q 50/06; G06Q 10/04; G06Q 10/0631; G06Q 10/20
USPC ........................................................ 700/295
See application file for complete search history.

(56) References Cited

U.S. PATENT DOCUMENTS

2015/0333517 A1\* 11/2015 Paquin .................... H02J 3/144
700/286
2018/0034278 A1\* 2/2018 Novak .............. H02J 13/00017

FOREIGN PATENT DOCUMENTS

| CN | 107346886 A | 11/2017 |
| CN | 109447416 A | 3/2019 |
| CN | 109768544 A | 5/2019 |
| CN | 110247391 A | 9/2019 |
| CN | 110601188 A | 12/2019 |
| WO | 2019063162 A1 | 4/2019 |

OTHER PUBLICATIONS

Liang, Guangyu, Flow Analysis Method of Power Grid Fault Auxiliary Decision, Techniques of Automation and Applications, vol. 38, No. 5, May 25, 2019 (May 25, 2019), ISSN: 1003-7241, pp. 106-110 and 140.

\* cited by examiner

METHOD FOR LOAD TRANSFER FOR OPEN-LOOP POWER GRID

CROSS REFERENCE OF RELATED APPLICATION

This application is the national phase of International Application No. PCT/CN2020/115440, titled "METHOD FOR PATH SORTING IN LOAD TRANSFER DECISION-MAKING FOR OPEN-LOOP POWER GRID", filed on Sep. 16, 2020, which claims priority to Chinese Patent Application No. 202010935900.0, titled "METHOD FOR PATH SORTING IN LOAD TRANSFER DECISION-MAKING FOR OPEN-LOOP POWER GRID", filed on Sep. 8, 2020 with the China National Intellectual Property Administration, both of which are incorporated herein by reference in their entireties.

FIELD

The present disclosure relates to the field of dispatching technology, and in particular to a method for prioritizing load transfer schemes for an open-loop power grid.

BACKGROUND

Load transfer is generally due to an abnormal operation (such as maintenance, overloading, and tripping) of a device. Such device may be referred to as a target device. The abnormal operation of the target device have an impact on a certain range of a power grid. Various methods may be applied to determine an impacted power grid and a real-time operation mode of the power grid. The operation mode mainly includes a real-time path and a real-time power distribution, and thus a load transfer analysis includes path analysis and power distribution analysis.

The power grid, no matter a high voltage distribution network or a medium and low voltage distribution network, generally operates in an open-loop. The path analysis is important for load transfer in the open-loop power grid. According to a conventional method, path analysis and prioritizing is performed based on a traditional power supply tree graph as shown in FIG. 2 or a wide-area topology power supply tree graph as shown in FIG. 3. The traditional power supply tree graph provides a clear description of an operating state of the open-loop power grid, but fails to illustrate all devices on power supply paths, such as a primary transformer, a switch, a knife switch, or a power line. Therefore, the traditional power supply tree graph is only a schematic diagram and not clear enough. The wide-area topology power supply tree was mentioned in a method for calculating a power flow of a power system disclosed in Chinese patent CN106849098A and a system for calculating a power flow of a power system disclosed in Chinese patent CN106899021A. However, the wide-area topology power supply tree has a poor generality due to a complicated structure.

SUMMARY

In order to overcome the problems that the traditional power supply tree is too simplified and cannot be used for path analysis and the method for path analysis and prioritizing using the wide-area topology power supply tree is too complicated, an intermediate power supply tree is constructed here for analysis, and a method for prioritizing load transfer schemes in an open-loop power grid is provided in the present disclosure.

According to the present technical solution, a method for prioritizing load transfer schemes in an open-loop power grid is provided. The method includes:
  step 1, determining a device triggering load transfer in the open-loop power grid;
  step 2, determining a target set [Q], where the target set [Q] includes devices in the power grid that are powered off in response to disconnection or load shedding of a target device;
  step 3, performing analysis on the target set [Q];
  step 4, determining a relevant power grid, where the relevant power grid is a part of the power grid downstream of a common parent device shared by the target device and a primary standby edge; and
  step 5, enumerating all transfer schemes for the target set [Q] based on results in step 3 and step 4, and prioritizing the transfer schemes based on a priority principle.

In a preferred embodiment, in step 1, the device includes a device that is to terminate a normal operation, a device that is not in a normal operation, or a device requiring load shedding. The target device includes a tripped device, a device requiring maintenance, or a device that is heavily loaded or overloaded.

In a preferred embodiment, in step 2 or step 3, the target set [Q] includes: a node-type device including a power line, a bus, a primary transformer or other devices that are not capable of being switched between on and off; and an edge-type device including a circuit breaker, an isolator switch, or other devices that are capable of being switched between on and off.

In a preferred embodiment, in step 3, the target set [Q] represents a set of devices downstream of the target device, and the target set [Q] is represented as a connected graph or a disconnected graph. The target set [Q] is represented as a disconnected graph when a quantity of target devices is more than one. In this case, a connected sub-graph of the disconnected graph indicates a subset of the target set [Q], and subsets of the target set [Q] are represented as set [Q1], [Q2], [Q3] . . . .

The performing analysis on the target set [Q] includes: step a, determining a quantity of nodes in the target set, a quantity of edges in the target set, power devices corresponding to the nodes in the target set, and power devices corresponding to the edges in the target set; step b, determining a quantity of standby edges connected to the target set and a location of each of the standby edges; and step c, determining a root-leaf relationship, or a parent child relationship, between any two of the nodes in the target set.

In a preferred embodiment, in step b, the quantity of the standby edges may be one, two, or more.

In a preferred embodiment, a process of determining and prioritizing transfer schemes using a single standby edge includes: (a) determining a node near the target device as a parent node with high priority, and determining a node far from the target device as a child node with low priority; and (b) in a case that two nodes connected to two single standby edges, respectively, are not the parent node or the child node with respect to each other, assigning higher priority to a standby edge having a same voltage level as the target device; or in a case that the two nodes connected to the two single standby edges are the parent node or the child node with respect to each other, assigning higher priority to a standby edge connected to the parent node.

In a preferred embodiment, a principle for selecting two standby edges for a transfer scheme is that: an edge on a path connecting two standby edges should be disconnected when using the two standby edges.

In a preferred embodiment, a process of determining and prioritizing transfer schemes using two standby edges includes: (i1) assigning higher priority to a standby edge with a same voltage level as the target node; (i2) assigning higher priority to a combination of two standby edges having a smaller sum of distances between the target node and each of the standby edges; and (i3) prioritizing based on a sequence of middle positions of disconnected edges.

In a preferred embodiment, a principle for selecting three standby edges for a transfer scheme is that: (1) two edges respectively on any two different paths connecting two of the three standby edges are disconnected; and (2) no island within the target set [Q] is additionally generated.

In a preferred embodiment, a process of determining and prioritizing transfer schemes using three standby edges includes: (c1) assigning higher priority to a standby edge with a same voltage level as the target node; (c2) assigning higher priority to a combination of three standby edges having a smaller sum of distances between the target node and each of the three standby edges; and (c3) prioritizing based on a sequence of middle positions of paths connecting two disconnected edges.

In a preferred embodiment, in a case of using an auxiliary standby edge, a principle for selecting an auxiliary edge for a transfer scheme is that: the auxiliary standby edge does not connect nodes within a same one of the subsets, but connects two different ones of the subsets.

Beneficial effects of the embodiments of the present disclosure, compared to the conventional technology, are described below.

With the present disclosure, the problems that the traditional power supply tree is too simplified and cannot be used for path analysis and the method for path analysis and prioritizing using the wide-area topology power supply tree is too complicated are solved. The present disclosure may be applied in developing a DTS training software system for dispatchers, to provide a standard power supply transfer scheme for an examiner, or developing a software system for optimizing an operation mode of an open-loop power grid, analyzing load transfer in an open-loop power grid and reconstructing a power network. The present disclosure may be used in revising a fault self-recovery strategy for a feeder group of a distribution network, and may be used in a dispatch automation system for automatically generating a control strategy based on a fault point specified by a dispatcher.

DETAILED DESCRIPTION

Figure 1:
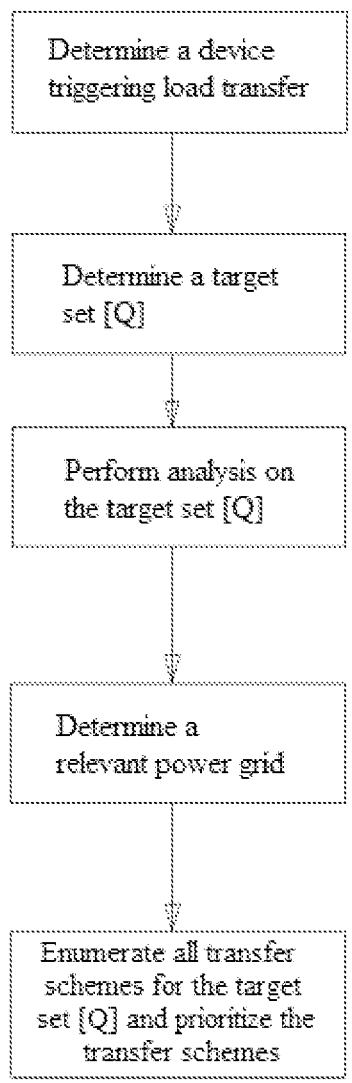
FIG. 1 is flow chart of a method for prioritizing load transfer schemes in an open-loop power grid.
Figure 2:
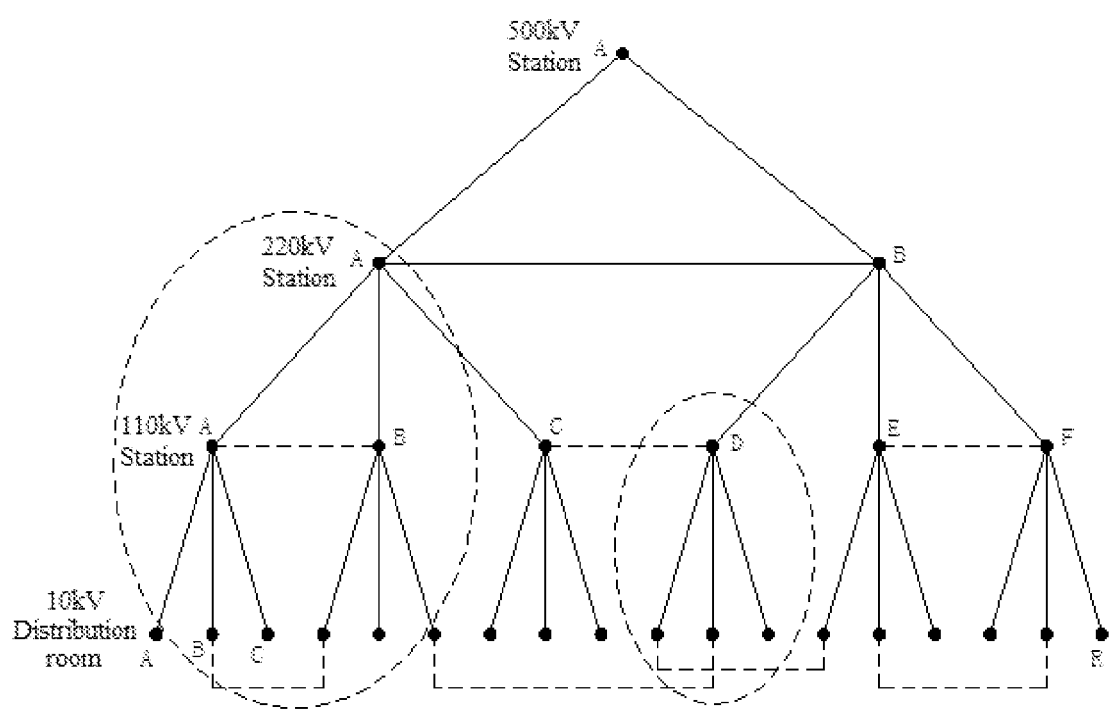
FIG. 2 is a tree diagram showing a topology of power supply according to a conventional technology.
Figure 3:
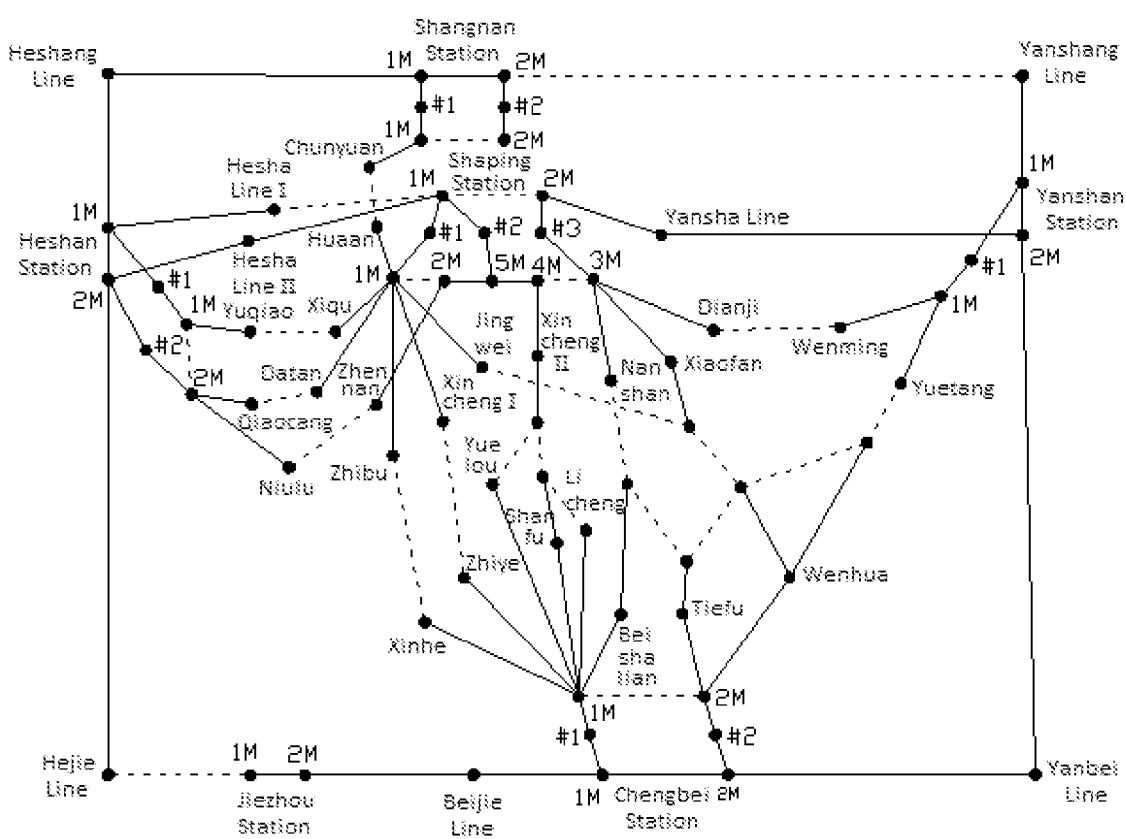
FIG. 3 is a tree diagram showing a topology of wide-area power supply according to a conventional technology.

The drawings are only used for exemplary illustration, and should not be understood as a limitation to the present disclosure. In order for a better illustration of the embodiments, some of components in the drawings may be omitted, enlarged or reduced, and do not represent an actual size of a product. It should be understood by those skilled in the art that some well-known structures and descriptions thereof may be omitted in the drawings. The positional relationships described in the drawings are only used for exemplary illustration, and should not be understood as a limitation to the present disclosure.

The same or similar reference numerals in the drawings of the embodiments of the present disclosure indicate the same or similar components. It should be understood that in the description of the present disclosure, orientations or position relationships, indicated by terms "upper", "lower", "left", "right", "long", "short", and the like, are shown based on the drawings. These terms are used for the convenience of describing the present disclosure and simplifying the description, rather than indicating or implying that devices or elements defined by the terms must have the designated orientation, or be constructed and operated in the designated orientation. Therefore, the terms describing a position relationship in the drawings are used only for exemplary illustration, and should not be understood as a limitation to the present disclosure. Those skilled in the art may understand meanings of the terms in a certain condition.

Technical solutions of the present disclosure are described in further details below through specific embodiments in conjunction with the drawings.

Embodiments

FIG. 3 to FIG. 8 show a method for prioritizing load transfer schemes in an open-loop power grid according to embodiments of the present disclosure. The method includes step 1 to step 5.

In step 1, a device triggering load transfer in the open-loop power grid is determined.

In step 2, a target set [Q] is determined, where the target set [Q] includes devices in the power grid that are powered off in response to disconnection or load shedding of a target device.

In step 3, analysis is performed on the target set [Q].

In step 4, a relevant power grid is determined, where the relevant power grid is a part of the power grid downstream of a common parent device shared by the target device and a primary standby edge.

In step 5, transfer schemes for the target set [Q] are all enumerated based on results in step 3 and step 4, and the transfer schemes are prioritized based on a priority principle.

In step 1, the device includes a device that is to terminate a normal operation, a device that is not in a normal operation, or a device requiring load shedding. The target device includes a tripped device, a device requiring maintenance, or a device that is heavily loaded or overloaded.

In step 2 or step 3, the target set [Q] includes: a node-type device including a power line, a bus, a primary transformer or other devices that are not capable of being switched between on and off; and an edge-type device including a circuit breaker, an isolator switch, or other devices that are capable of being switched between on and off.

In step 3, the target set [Q] represents a set of devices downstream of the target device, and the target set [Q] is represented as a connected graph or a disconnected graph. The target set [Q] is represented as a disconnected graph when including multiple target devices. In this case, a connected sub-graph of the disconnected graph indicates a subset of the target set [Q], and subsets of the target set [Q] are represented as set [Q1], [Q2], [Q3] . . . .

The performing analysis on the target set [Q] includes: step a, determining a quantity of nodes in the target set, a quantity of edges in the target set, power devices corresponding to the nodes in the target set, and power devices corresponding to the edges in the target set; step b, determining a quantity of standby edges connected to the target set and a location of each of the standby edges; and step c, determining a root-leaf relationship, or a parent child relationship, between any two of the nodes in the target set.

In step b, the quantity of the standby edges may be one, two, or more.

A process of determining and prioritizing transfer schemes using a single standby edge includes:
(a) determining a node near the target device as a parent node with high priority, and determining a node far from the target device as a child node with low priority; and
(b) in a case that two nodes connected to two single standby edges, respectively, are not the parent node or the child node with respect to each other, assigning higher priority to a standby edge having a same voltage level as the target device; or in a case that the two nodes connected to the two single standby edges are the parent node or the child node with respect to each other, assigning higher priority to a standby edge connected to the parent node.

A principle for selecting two standby edges for a transfer scheme is that: an edge on a path connecting two standby edges should be disconnected when using the two standby edges.

A process of determining and prioritizing transfer schemes using two standby edges includes:
(i1) assigning higher priority to a standby edge with a same voltage level as the target node;
(i2) assigning higher priority to a combination of two standby edges having a smaller sum of distances between the target node and each of the two standby edges; and
(i3) prioritizing based on a sequence of middle positions of disconnected edges.

A principle for selecting three standby edges for a transfer scheme is that:
(1) two edges respectively on any two different path connecting two of the three standby edges are disconnected; and
(2) no island within the target set [Q] is additionally generated.

A process of determining and prioritizing transfer schemes using three standby edges includes:
(c1) assigning higher priority to a standby edge with a same voltage level as the target node;
(c2) assigning higher priority to a combination of three standby edges having a smaller sum of distances between the target node and each of the three standby edges; and
(c3) prioritizing based on a sequence of middle positions of paths connecting two disconnected edges.

Moreover, in a case of using an auxiliary standby edge, a principle for selecting an auxiliary standby edge for a transfer scheme is that: the auxiliary standby edge does not connect nodes within a same one of the subsets, but connects two different ones of the subsets.

Specific embodiments are described below.

Figure 4:
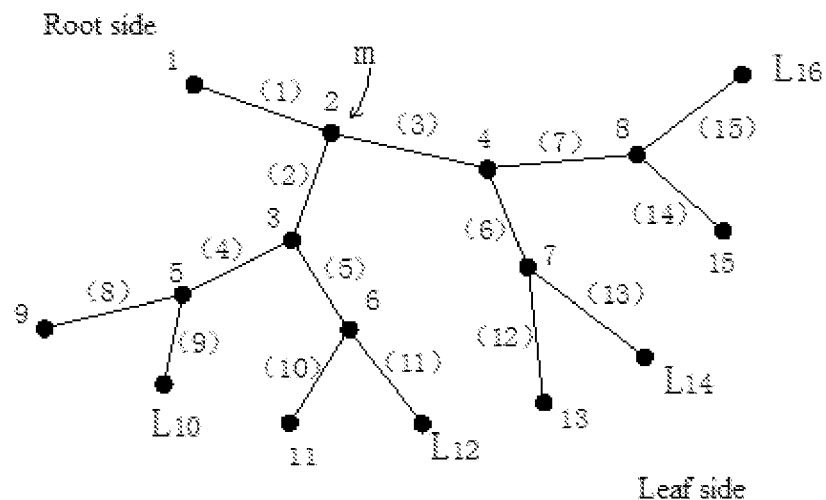
FIG. 4 is a diagram of a designated power grid.

In an embodiment, as shown in FIG. 4, an exemplary power grid includes 16 nodes and 15 edges for power transmission. A node denoted with an "L" represents a pure PQ bus, such as a terminal distribution transformer. In FIG. 4, node 2 represents a target device. Devices on a leaf side of the target device in the power grid are impacted because of the target device, and constitute a target set [Q]. A purpose of load transfer is to transfer as many of the devices in the target set [Q] as possible to a new power supply path, so as to reduce an impact due to abnormal operation of a device.

In a case that there is no standby edge connecting to the target set [Q], no transfer scheme is available, as shown in FIG. 4. In a case that there exists a standby edge connected to the target set [Q], transfer schemes may be categorized into using a single standby edge, using two standby edges, and using multiple standby edges, as shown in the figures.

Figure 5:
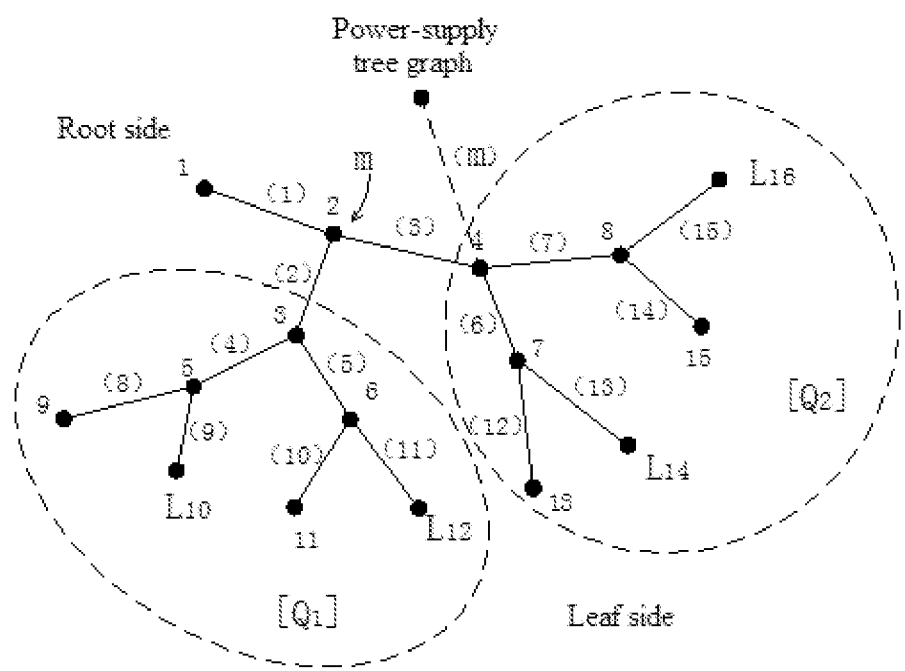
FIG. 5 is a diagram of a power grid with a single standby power supply.

FIG. 5 shows a situation of using a single standby edge. In this case, there is one transfer scheme, expressed as:
[Q2]→(m); [Q1]→0, which means set [Q2] is powered via edge (m), and set [Q1] is not powered.

Figure 6:
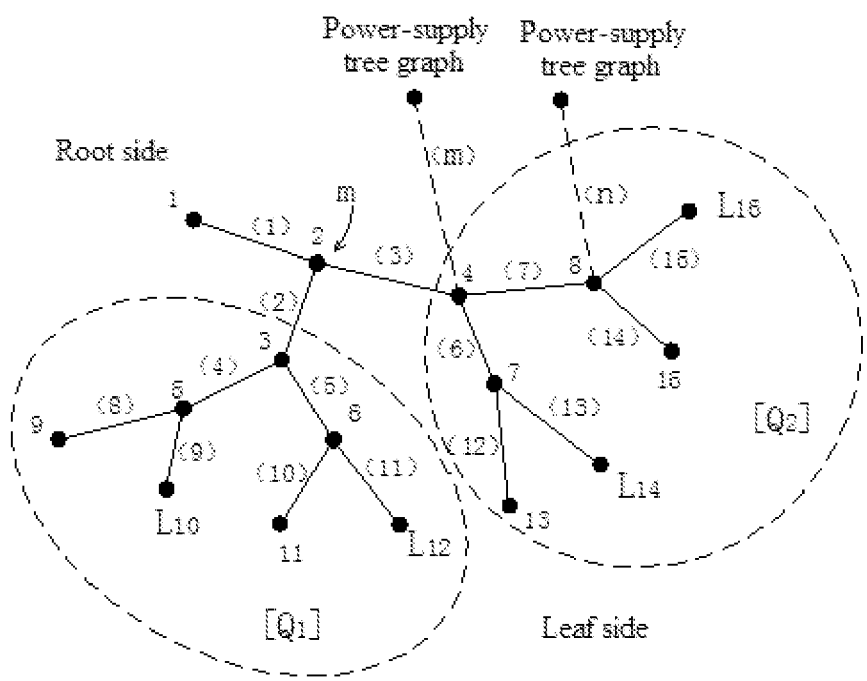
FIG. 6 is a diagram of a power grid with two standby power supplies.

FIG. 6 shows a situation of using two standby edges. In this case, multiple transfer schemes are available, which are enumerated and illustrated in an order from high priority to low priority:
1. [Q2]→(m); [Q1]→0.
2. [Q2]→(n); [Q1]→0.
3. [Q2]→(m)(n)/(7); [Q1]→0, which means set [Q2] is powered via edge (m) and (n), and "/(7)" indicates that edge (7) connected between (m) and (n) is disconnected, in order to avoid appearance of a terminal loop network.

The three transfer schemes are prioritized in accordance with a priority principle below.

Using one of the standby edges is prioritized.
1. In a case that two nodes connected to two single standby edges respectively are not in a parent-child relationship, higher priority is assigned to a standby edge with a same voltage level as the target device.
2. In a case that two nodes connected to two single standby edges respectively are in a parent-child relationship, higher priority is assigned to a parent node of the two nodes.
3. Other cases can be deduced by analogy.

(II) Using two of the standby edges is considered next. When adopting two standby edges for load transfer, an edge on a path connecting the two standby edges should be disconnected, in order to avoid appearance of a terminal loop network.

Figure 7:
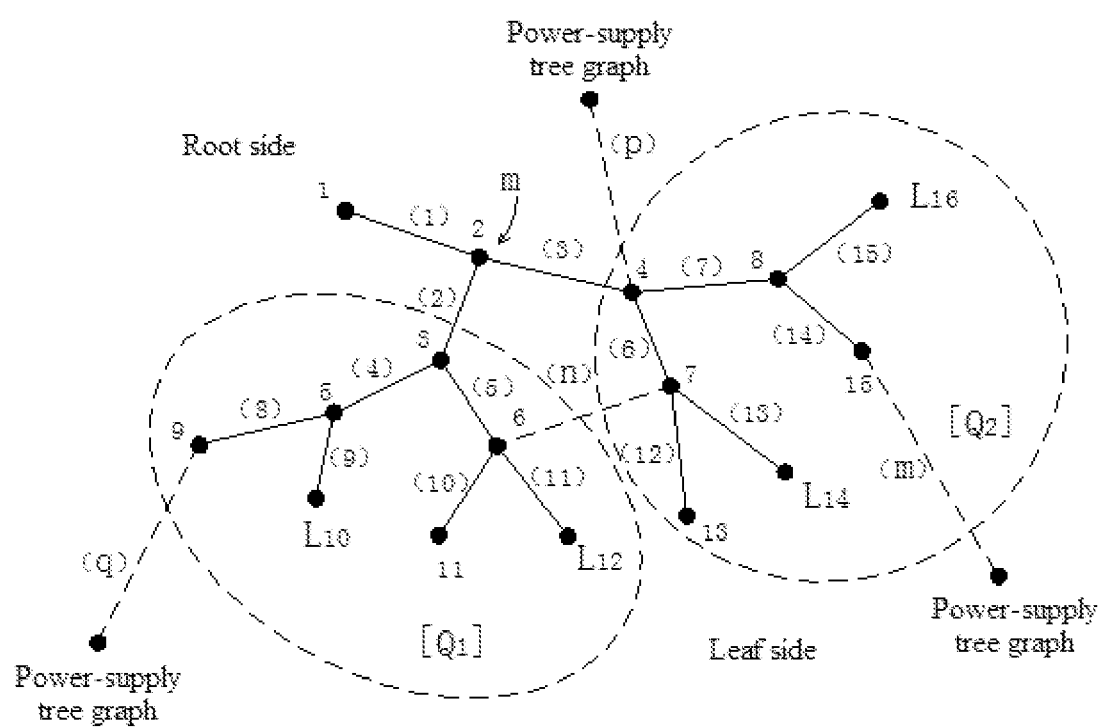
FIG. 7 is a diagram of a power grid with multiple standby power supplies.

FIG. 7 shows a situation of using multiple standby edges. In addition to three standby edges (m), (p), and (q), there is a standby edge (n) connecting two nodes in the target set. In this case, the standby edges (m), (p), and (q) are each referred to as a primary standby edge, and (n) is referred to as an auxiliary standby edge. Transfer schemes are enumerated and illustrated in an order from high priority to low priority:
1. [Q2]→(p); [Q1]→(q).
2. [Q2]→(m); [Q1]→(q).
3. [Q2]→(m)(p)/(7); [Q1]→(q).
4. [Q2]→(m)(p)/(14); [Q1]→(q).
5. [Q1]+[Q2]→(p)(n).
6. [Q1]+[Q2]→(q)(n).

7. [Q1]+[Q2]→(m)(n).
8. [Q1]+[Q2]→(p)(q)(n)/(6).
9. [Q1]+[Q2]→(p)(q)(n)/(5).
10. [Q1]+[Q2]→(p)(q)(n)/(4).
11. [Q1]+[Q2]→(p)(q)(n)/(8).
12. [Q1]+[Q2]→(m)(q)(n)/(14).
13. [Q1]+[Q2]→(m)(q)(n)/(7).
14. [Q1]+[Q2]→(m)(q)(n)/(6).
15. [Q1]+[Q2]→(m)(q)(n)/(5).
16. [Q1]+[Q2]→(m)(q)(n)/(4).
17. [Q1]+[Q2]→(m)(q)(n)/(8).
18. [Q1]+[Q2]→(m)(p)(q)(n)/(8)(7).
19. [Q1]+[Q2]→(m)(p)(q)(n)/(8)(14).
20. [Q1]+[Q2]→(m)(p)(q)(n)/(4)(7).
21. [Q1]+[Q2]→(m)(p)(q)(n)/(4)(14).
22. [Q1]+[Q2]→(m)(p)(q)(n)/(5)(7).
23. [Q1]+[Q2]→(m)(p)(q)(n)/(5)(14).
24. [Q1]+[Q2]→(m)(p)(q)(n)/(6)(7).
25. [Q1]+[Q2]→(m)(p)(q)(n)/(6)(14).

A complete principle for enumerating and prioritizing load transfer schemes is summarized and listed as follows.

(I) First, with the auxiliary standby edge ignored, enumerate and prioritize transfer schemes regarding each connected subset of the target set using the primary standby edges, which should comply with following principles.

1. For a transfer scheme using a single standby edge.
   1) Higher priority is assigned to a standby edge having a same voltage level as the target node.
   2) Higher priority is assigned to a standby edge having a smaller sum of distances between the target node and each of the three standby edges.

2. For a transfer scheme using two standby edges.

Using two standby edges should comply with following principles. First, the two standby edges must not be connected to each other, that is, an edge on a path connecting the two standby edges must be disconnected. Second, no island within the target set is additionally generated. Specifically:
   1) Higher priority is assigned to a standby edge having a same voltage level as the target node.
   2) Higher priority is assigned to a combination of two standby edges having a smaller sum of distances between the target node and each of the two standby edges.
   3) The other load transfer schemes are prioritized based on a sequence of middle positions of disconnected edges.

3. For a transfer scheme using three standby edges.

Using three standby edges should comply with following principles. (1) every two of the three standby edges must not be connected to each other, that is, any two edges on any two different paths connecting two of the three standby edges must be disconnected. (2) no island within the target set is additionally generated. Specifically:
   1) Higher priority is assigned to a standby edge having a same voltage level as a target node.
   2) Higher priority is assigned to a combination of three standby edges having a smaller sum of distances between the target node and each of the three standby edges.
   3) Other load transfer schemes are prioritized based on a sequence of middle positions of paths connecting two standby edges.

4. Other cases can be deduced by analogy.

(II) Considering of using an auxiliary standby edge in a load transfer scheme. The auxiliary standby edge should not connect nodes within a same one of the subsets, but connect two different ones of the subsets. Using an auxiliary standby edge should comply with following principles.

1. With an objective to connect subsets of the target set that are disconnected to each other, an auxiliary standby edge is permitted in a load transfer scheme with reference to following principles.
   1) Higher priority is achieved when less auxiliary standby edges are utilized or more subsets are connected.
   2) Higher priority is achieved when a sum of distances between each auxiliary standby edge and the target node is smaller.
   3) The principle 1) is prior to the principle 2) when choosing from alternative auxiliary standby edges.

2. After the target set changes with the auxiliary standby edge utilized, transfer schemes for the target set including the auxiliary standby edge are enumerated and prioritized complying with the principles described in item (I).

Figure 8:
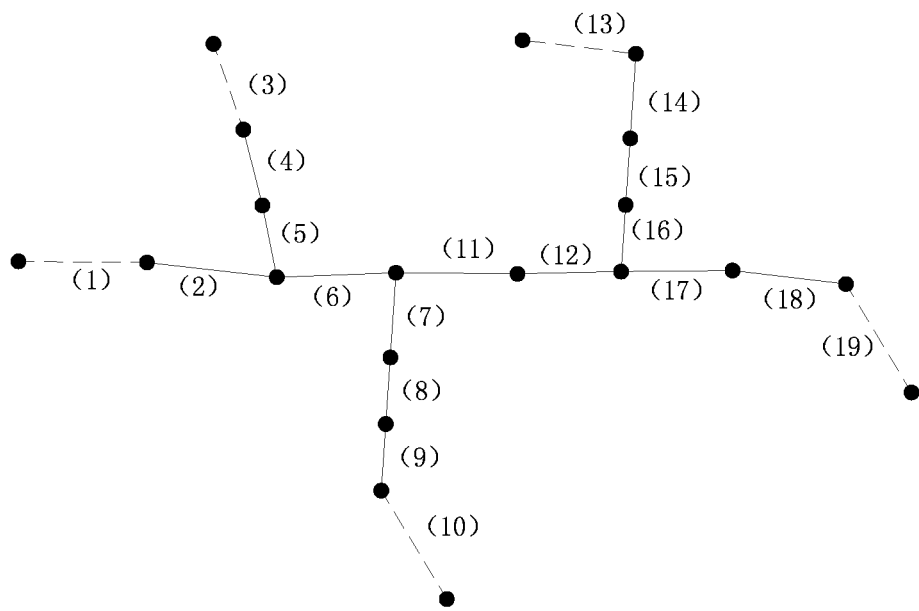
FIG. 8 is a diagram of a power grid including five end nodes connected to each other.

(III) An algorithm for enumerating a quantity of combinations of schemes for a same connected set is applied. FIG. 8 shows a set whose five end nodes are connected to each other, and five edges connected to the end nodes are all set as standby edges. Combining paths using a single standby edge, paths using two standby edges, and paths using multiple standby edges for the set should comply with the following principles.

1. Any two of end nodes must not be connected to each other.
2. No island should exist.

Therefore, the connected graph may satisfy the two conditions when and only when four edges are disconnected. However, the number of combinations cannot be calculated simply as $C_{19}^4=3876$.

As shown in FIG. 8, intermediate nodes in a path composed of edge (3), edge (4), and edge (5) are all transition nodes. On this path, two or more edges cannot be disconnected at a same time; otherwise an island is formed. Similarly, two or more edges cannot be disconnected at a same time for the path composed of edge (1) and edge (2), the path composed of edge (7), edge (8), edge (9), and edge (10), the path composed of edge (13), edge (14), edge (15), and edge (16), and the path composed of edge (17), edge (18), and edge (19). Each of the paths may be referred to as an arm and may be replaced by a single edge. Similarly, all transition nodes may be simplified, and edges connected at the transition node may be combined into one edge. Moreover, a ring network, if occurs within the connected graph, is reduced to a single point.

Figure 9:
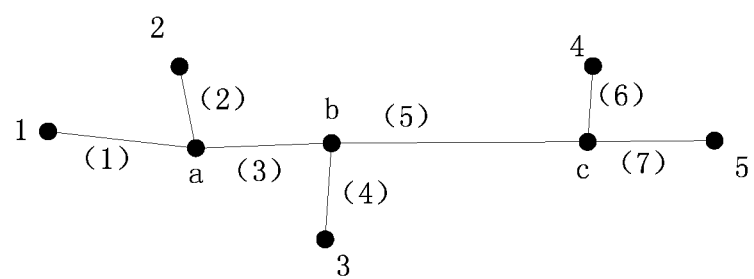
FIG. 9 is a simplified diagram of FIG. 8.

In this way, FIG. 8 can always be simplified to the graph in FIG. 9, including five end nodes, three distribution nodes, and seven edges. It can be seen from FIG. 9 that the conditions of no island and no edge between any pair of nodes are satisfied if and only if each of the distribution nodes is connected to an end node via one path. Since a longest path between an end node and a distribution node includes three edges, the number of edges to be retained is also three, that is, four edges need to be disconnected.

The number of combinations for disconnecting four edges among seven edges is calculated as $$C_7^4 = \frac{7 \times 6 \times 5}{3 \times 2} = 35,$$

which is equal to the number of combinations for retaining three edges. Since the retained edges must be connected to the distribution nodes, the question turns to how many combinations exist when selecting one edge from the edges connected to each of the three distribution nodes. Obviously, the number is calculated as 3×3×3=27.

However, since edge (3) and edge (5) are shared by the distribution nodes, the number of valid combinations is actually 21, and the combinations are specifically listed in Table 1 below:

TABLE 1

|  | First retained edge | Second retained edge | Third retained edge |
|---|---|---|---|
| Combination 1 | (1) | (3) | (5) |
| Combination 2 | (1) | (3) | (6) |
| Combination 3 | (1) | (3) | (7) |
| Combination 4 | (1) | (4) | (5) |
| Combination 5 | (1) | (4) | (6) |
| Combination 6 | (1) | (4) | (7) |
| Combination 7 | (1) | (5) | (6) |
| Combination 8 | (1) | (5) | (7) |
| Combination 9 | (2) | (3) | (5) |
| Combination 10 | (2) | (3) | (6) |
| Combination 11 | (2) | (3) | (7) |
| Combination 12 | (2) | (4) | (5) |
| Combination 13 | (2) | (4) | (6) |
| Combination 14 | (2) | (4) | (7) |
| Combination 15 | (2) | (5) | (6) |
| Combination 16 | (2) | (5) | (7) |
| Combination 17 | (3) | (4) | (5) |
| Combination 18 | (3) | (4) | (6) |
| Combination 19 | (3) | (4) | (7) |
| Combination 20 | (3) | (5) | (6) |
| Combination 21 | (3) | (5) | (7) |

Correspondingly, the combinations of sides that need to be disconnected are shown in Table 2.

TABLE 2

|  | First disconnected edge | Second disconnected edge | Third disconnected edge | Fourth disconnected edge |
|---|---|---|---|---|
| Combination 1 | (2) | (4) | (6) | (7) |
| Combination 2 | (2) | (4) | (5) | (7) |
| Combination 3 | (2) | (4) | (5) | (6) |
| Combination 4 | (2) | (3) | (6) | (7) |
| Combination 5 | (2) | (3) | (5) | (7) |
| Combination 6 | (2) | (3) | (5) | (6) |
| Combination 7 | (2) | (3) | (4) | (7) |
| Combination 8 | (2) | (3) | (4) | (6) |
| Combination 9 | (1) | (4) | (6) | (7) |
| Combination 10 | (1) | (4) | (5) | (7) |
| Combination 11 | (1) | (4) | (5) | (6) |
| Combination 12 | (1) | (3) | (6) | (7) |
| Combination 13 | (1) | (3) | (5) | (7) |
| Combination 14 | (1) | (3) | (5) | (6) |
| Combination 15 | (1) | (3) | (4) | (7) |
| Combination 16 | (1) | (3) | (4) | (6) |
| Combination 17 | (1) | (2) | (6) | (7) |
| Combination 18 | (1) | (2) | (5) | (7) |
| Combination 19 | (1) | (2) | (5) | (6) |
| Combination 20 | (1) | (2) | (4) | (7) |
| Combination 21 | (1) | (2) | (4) | (6) |

After restoring the edges in FIG. 9 to the edges in FIG. 8, that is, restoring the transition nodes, each of the edges in FIG. 9 corresponds to an actual number of edges, i.e., edge (1) is restored to two edges; edge (2) is restored to three edges; edge (3) is restored to one edge; edge (4) is restored to four edges; edge (5) is restored to two edges; edge (6) is restored to four edges; and edge (7) is restored to three edges.

The actual numbers for each of the edges are introduced into table 2 and multiplied, and the results are shown in Table 3.

TABLE 3

|  | First disconnected edge | Second disconnected edge | Third disconnected edge | Fourth disconnected edge | quantity of edges | quantity of edge | quantity of edge | quantity of edge | product |
|---|---|---|---|---|---|---|---|---|---|
| Combination 1 | (2) | (4) | (6) | (7) | 3 | 4 | 4 | 3 | 144 |
| Combination 2 | (2) | (4) | (5) | (7) | 3 | 4 | 2 | 3 | 72 |
| Combination 3 | (2) | (4) | (5) | (6) | 3 | 4 | 2 | 4 | 96 |
| Combination 4 | (2) | (3) | (6) | (7) | 3 | 1 | 4 | 3 | 36 |
| Combination 5 | (2) | (3) | (5) | (7) | 3 | 1 | 2 | 3 | 18 |
| Combination 6 | (2) | (3) | (5) | (6) | 3 | 1 | 2 | 4 | 24 |
| Combination 7 | (2) | (3) | (4) | (7) | 3 | 1 | 4 | 3 | 36 |
| Combination 8 | (2) | (3) | (4) | (6) | 3 | 1 | 4 | 4 | 48 |
| Combination 9 | (1) | (4) | (6) | (7) | 2 | 4 | 4 | 3 | 96 |
| Combination 10 | (1) | (4) | (5) | (7) | 2 | 4 | 2 | 3 | 48 |
| Combination 11 | (1) | (4) | (5) | (6) | 2 | 4 | 2 | 4 | 64 |
| Combination 12 | (1) | (3) | (6) | (7) | 2 | 1 | 4 | 3 | 24 |
| Combination 13 | (1) | (3) | (5) | (7) | 2 | 1 | 2 | 3 | 12 |
| Combination 14 | (1) | (3) | (5) | (6) | 2 | 1 | 2 | 4 | 16 |
| Combination 15 | (1) | (3) | (4) | (7) | 2 | 1 | 4 | 3 | 24 |
| Combination 16 | (1) | (3) | (4) | (6) | 2 | 1 | 4 | 4 | 32 |
| Combination 17 | (1) | (2) | (6) | (7) | 2 | 3 | 4 | 3 | 72 |
| Combination 18 | (1) | (2) | (5) | (7) | 2 | 3 | 2 | 3 | 36 |
| Combination 19 | (1) | (2) | (5) | (6) | 2 | 3 | 2 | 4 | 48 |
| Combination 20 | (1) | (2) | (4) | (7) | 2 | 3 | 4 | 3 | 72 |
| Combination 21 | (1) | (2) | (4) | (6) | 2 | 3 | 4 | 4 | 96 |
| Sum of the products |  |  |  |  |  |  |  |  | 1114 |

In Table 3, there are a total of 1114 combinations of split paths that satisfy the conditions of no island and no edge between any pair of end nodes, which is much less than the 3876 combinations when directly taking 4 edges from 19 edges. Considering the graph as a target set in a power supply tree, it is a connected graph with multiple standby edges, and the 1114 split paths include use of a single standby edge, two standby edges and multiple standby edges. Therefore, the above is a general analysis method.

The above embodiments of the present disclosure are merely examples provided for a purpose of a clear illustration of the present disclosure, and are not intended to limit an implementation of the present disclosure. For those of ordinary skill in the art, other changes or modifications in different forms may be made on the basis of the above description. It is unnecessary and impossible to list all the implementations here. Any modification, equivalent substitution, or improvement made within the spirit and the principle of the present disclosure shall fall within the protection scope of the claims of the present disclosure.

The invention claimed is:

1. A method for load transfer for an open-loop power grid, comprising:
constructing a tree graph for the open-loop power grid based on power transmission among devices in the open-loop power grid, in which each node represents a node-type device that is not capable of being switched between on and off, each edge represents an edge-type device that is capable of being switched between on and off, wherein each standby edge connected to the tree graph represents a standby power supply for the open-loop power grid;
determining a target node representing a target device which triggers load transfer in the open-loop power grid;
determining one or more target graphs, wherein each of the target graphs is a connected sub-graph of the tree graph in downstream of the target node, and represents devices in the open-loop power grid that are powered off in response to disconnection or load shedding of the target device;
enumerating all transfer schemes for the target graphs based on the target graphs, and prioritizing the transfer schemes; and
performing load transfer based on the prioritized transfer schemes.

2. The method according to claim 1, wherein
the target device comprises a tripped device, a device requiring maintenance, or a device that is overloaded.

3. The method according to claim 1, wherein
the node-type device comprises a power line, a bus, or a primary transformer; and
the edge-type device comprises a circuit breaker, or an isolator switch.

4. The method according to claim 1, further comprising:
determining a quantity of nodes in the one or more target graphs, and a quantity of edges in the one or more target graphs; and
determining a quantity of standby edges connected to the one or more target graphs.

5. The method according to claim 4, wherein the prioritizing the transfer schemes comprises:
prioritizing the transfer schemes by a quantity of standby edges used for one of the target graphs from least to most.

6. The method according to claim 5, wherein the prioritizing the transfer schemes further comprises:
for two of the transfer schemes in which a single standby edge is used for the one of the target graphs,
in response to a node connected to the single standby edge used by one of the two transfer schemes being neither a parent node nor a child node of a node connected to the single standby edge used by another of the two transfer schemes, and in response to the single standby edge used by the one of the two transfer schemes providing a voltage same as a voltage provided by the target device while the single standby edge used by the another of the two transfer schemes providing a voltage different from the voltage provided by the target device, assigning higher priority to the one of the two transfer schemes; and
in response to a node connected to the single standby edge used by one of the two transfer schemes being a parent node of a node connected to the single standby edge used by another of the two transfer schemes, assigning higher priority to the one of the two transfer schemes.

7. The method according to claim 5, wherein in each of the transfer schemes in which two standby edges are used for the one of the target graphs, an edge which is in the target graph and on a path connecting the two standby edges is disconnected.

8. The method according to claim 7, wherein the prioritizing the transfer schemes further comprises:
for two of the transfer schemes in which two standby edges are used for the one of the target graphs,
in response to that a quantity of standby edges of the two standby edges used by one of the two transfer schemes that provide a voltage same as a voltage provided by the target device is greater than a quantity of standby edges of the two standby edges used by another of the two transfer schemes that provide a voltage same as the voltage provided by the target device, assigning higher priority to the one of the two transfer schemes;
in response to that the quantity of standby edges of the two standby edges used by one of the two transfer schemes that provide a voltage same as a voltage provided by the target device is equal to a quantity of standby edges of the two standby edges used by another of the two transfer schemes that provide a voltage same as the voltage provided by the target device, and in response to that a sum of distances between the target node and each of the two standby edges used by the one of the two transfer schemes is smaller than a sum of distances between the target node and each of the two standby edges used by the another one of the two transfer schemes, assigning higher priority to the one of the two transfer schemes; and
in response to that the quantity of standby edges of the two standby edges used by one of the two transfer schemes that provide a voltage same as a voltage provided by the target device is equal to a quantity of standby edges of the two standby edges used by another of the two transfer schemes that provide a voltage same as the voltage provided by the target device, and in response to that a sum of distances between the target node and each of the two standby edges used by the one of the two transfer schemes is equal to a sum of distances between the target node and each of the two standby edges used by the another one of the two transfer schemes, prioritizing the transfer schemes based on a middle position of the disconnected edge.

9. The method according to claim 5, wherein in each of the transfer schemes in which three standby edges are used for the one of the target graphs:
for every two standby edges among the three standby edges,
an edge which is in the target graph and on a path connecting the two standby edges is disconnected; and wherein
no island, which is not connected to any standby edge, is generated within the target graph when the edge is disconnected.

10. The method according to claim 9, wherein the prioritizing the transfer schemes further comprises:
for two of the transfer schemes in which three standby edges are used for the one of the target graphs,
in response to that a quantity of standby edges of the three standby edges used by one of the two transfer schemes that provide a voltage same as a voltage provided by the target device is greater than a quantity of standby edges of the three standby edges used by another of the two transfer schemes that provide a voltage same as the voltage provided by the target device, assigning higher priority to the one of the two transfer schemes;
in response to that the quantity of standby edges of the three standby edges used by one of the two transfer schemes that provide a voltage same as a voltage provided by the target device is equal to a quantity of standby edges of the three standby edges used by another of the two transfer schemes that provide a voltage same as the voltage provided by the target device, and in response to that a sum of distances between the target node and each of the three standby edges used by the one of the two transfer schemes is smaller than a sum of distances between the target node and each of the three standby edges used by the another one of the two transfer schemes, assigning higher priority to the one of the two transfer schemes; and
in response to that the quantity of standby edges of the three standby edges used by one of the two transfer schemes that provide a voltage same as a voltage provided by the target device is equal to a quantity of standby edges of the three standby edges used by another of the two transfer schemes that provide a voltage same as the voltage provided by the target device, and in response to that a sum of distances between the target node and each of the three standby edges used by the one of the two transfer schemes is equal to a sum of distances between the target node and each of the three standby edges used by the another one of the two transfer schemes, prioritizing the transfer schemes based on a middle position of a path connecting two disconnected edges.

11. The method according to claim 5, wherein an auxiliary standby edge is used in at least one of the transfer schemes, and
in each of the at least one of the transfer schemes, the auxiliary standby edge connects two nodes that are located in different ones of the one or more target graphs.

12. The method according to claim 1, wherein the downstream is a direction away from a root node in the tree graph.

* * * * *